US006614133B2

(12) United States Patent
Belson et al.

(10) Patent No.: US 6,614,133 B2
(45) Date of Patent: Sep. 2, 2003

(54) POWER SYSTEM WITH PLURAL PARALLEL POWER SUPPLIES WITH AT LEAST ONE POWER SUPPLY IN STANDBY MODE FOR ENERGY EFFICIENCY

(75) Inventors: Steve Belson, Plano, TX (US); Shaun L. Harris, McKinney, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 20 days.

(21) Appl. No.: 10/001,582

(22) Filed: Oct. 31, 2001

(65) Prior Publication Data
US 2003/0080624 A1 May 1, 2003

(51) Int. Cl.$^7$ .................................................. H02J 1/10
(52) U.S. Cl. .............................. 307/58; 307/29; 307/82; 307/86; 363/65
(58) Field of Search ........................... 307/23, 29, 39, 307/64, 82, 86, 51, 58; 363/65, 69

(56) References Cited
U.S. PATENT DOCUMENTS

| 4,191,992 | A | * | 3/1980 | Johannesson | 307/86 |
| 4,860,188 | A | * | 8/1989 | Bailey et al. | 307/82 |
| 5,200,643 | A | * | 4/1993 | Brown | 307/58 |
| 5,266,838 | A | | 11/1993 | Gerner | 307/19 |
| 5,353,215 | A | * | 10/1994 | Dinwiddie et al. | 363/65 |
| 5,675,480 | A | * | 10/1997 | Stanford | 363/21 |
| 5,861,684 | A | | 1/1999 | Slade et al. | 307/66 |
| 6,297,976 | B1 | * | 10/2001 | Isono | 363/65 |
| 6,307,762 | B1 | * | 10/2001 | Shiobara | 307/86 |
| 6,414,864 | B1 | * | 7/2002 | Hoshi | 363/69 |

* cited by examiner

Primary Examiner—Jeffrey Sterrett
(74) Attorney, Agent, or Firm—Augustus W. Winfield

(57) ABSTRACT

In a system having multiple power supplies with outputs connected in parallel, the number of supplies providing current is controlled to improve the overall system efficiency. For example, when the output current of individual power supplies falls below a threshold, one or more supplies may be placed into a standby mode. This increases the output current of the supplies that are in an operational mode, improving the efficiency of the supplies that are in an operational mode.

32 Claims, 5 Drawing Sheets

POWER SYSTEM WITH PLURAL PARALLEL POWER SUPPLIES WITH AT LEAST ONE POWER SUPPLY IN STANDBY MODE FOR ENERGY EFFICIENCY

FIELD OF INVENTION

This invention relates generally to power supplies for electronic systems.

BACKGROUND OF THE INVENTION

Electronic equipment requires a source of electrical power. Typically, AC power is converted to at least one DC voltage at a level required by the electronic equipment. In large electronic systems, for example, telecommunications systems and large computer server systems, it is common to provide multiple power supplies, operating with outputs in parallel. It is also common to provide redundant power supplies to ensure continuous operation even with the failure of one or more power supplies. For example, in the telecommunications industry, if N power supplies are needed, it is common to use N+1 power supplies. It is also known to provide two separate sources of AC power, with separate banks of power supplies on each source of AC power, to ensure continuous operation even with the failure of one AC power source. For example, in large computer server systems, if N power supplies are needed, it is known to provide two different AC power sources with N+1 power supplies on each AC power source (2N+2 total power supplies with outputs in parallel). Alternatively, at least one isolated DC voltage may be distributed, and multiple local DC-to-DC converters may operate in parallel to provide the voltages and currents needed by each local system.

The number of power supplies operating with parallel outputs is typically determined by worst-case current load requirements. For example, if a system requires 100 amps maximum, and each power supply can provide 10 amps maximum, then at least 10 power supplies are connected to operate with outputs in parallel. If the actual current load is less than the worst-case current load, then each power supply provides some fraction of the maximum design current per power supply. Power supply redundancy may result in each power supply providing a relatively small fraction of the maximum design current per power supply. In general, within the designed range of output current, individual power supply efficiency improves with increasing output current. Power supply redundancy may result in each power supply operating at a reduced efficiency. For example, in a system with two power sources and 2N+2 power supplies, if both power sources are available, and if all power supplies are operational, then N+1 supplies are redundant, and each individual power supply is providing less than 50% of its maximum output current. There is a need for more efficient operation of power supplies configured with parallel outputs.

SUMMARY OF THE INVENTION

Output current is monitored for at least some power supplies. The number of power supplies providing current is then controlled to improve the overall system efficiency. For example, when the output current of one or more individual power supplies falls below a threshold, one or more power supplies may be placed into a standby mode. This increases the output current of the power supplies that are in an operational mode, improving their efficiency. If the current load increases, one or more supplies in standby mode can be rapidly switched to an operational mode. Optionally, a controller may also turn some power supplies completely off (or offline), as opposed to just switching to a standby mode, further conserving energy.

DETAILED DESCRIPTION OF THE PREFERRED EMBODIMENT OF THE INVENTION

Figure 1:
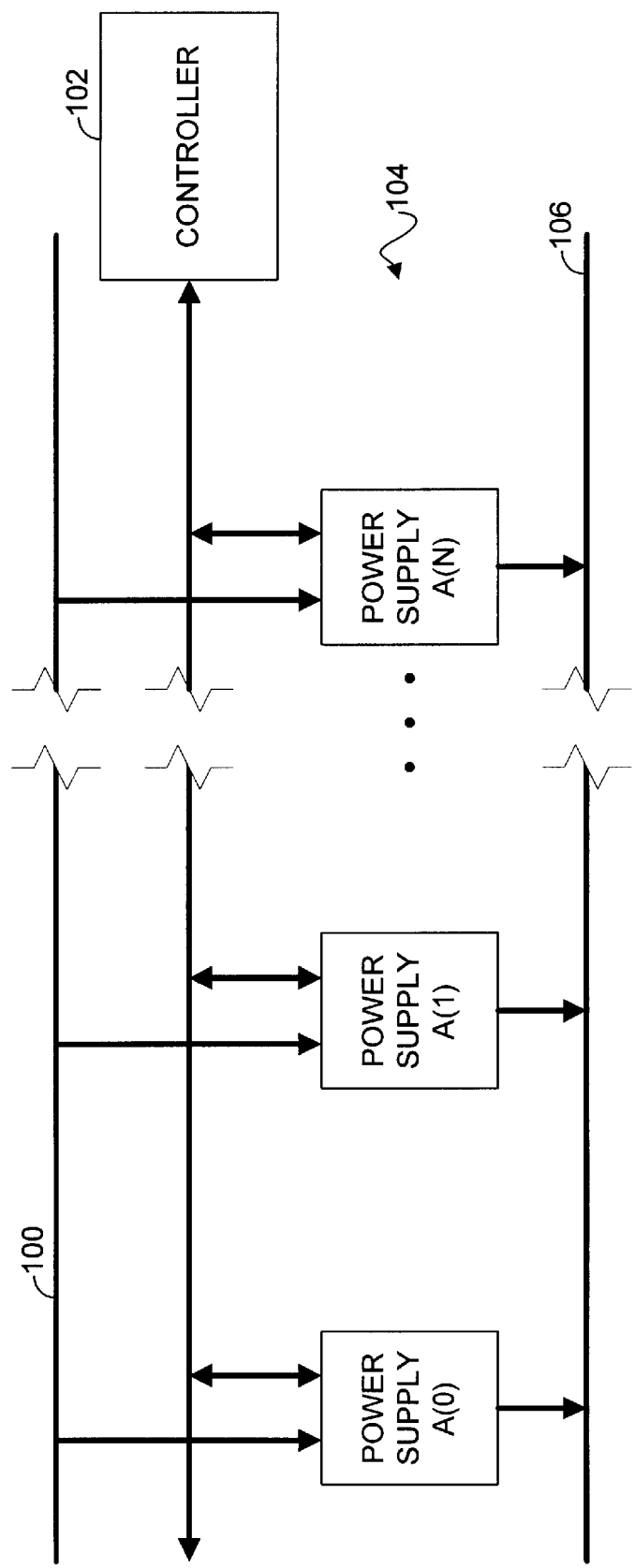
FIG. 1 is a block diagram of an example of a power supply system with a single power source in accordance with the invention.

FIG. 1 illustrates an example of a power supply system for which the invention is applicable. In the system illustrated in FIG. 1, there is a single power source 100. Power source 100 may be an AC main or a DC source. FIG. 1 depicts three of N+1 power supplies (generally identified by reference number 104), labeled A(0)–A(N). The outputs of all the power supplies 104 are connected in parallel (through isolation diodes) to a DC power bus 106. DC power bus 106 may have multiple DC voltages plus one or more reference potentials or ground. A controller 102, discussed in more detail below, receives signals from the power supplies 104 and sends control signals to the power supplies 104. The controller may receive from each power supply, for example, a signal indicating whether the input voltage to the power supply is within a specified range, a signal indicating whether the output voltage is within a specified range, a signal indicating whether the output current for the power supply is within a specified range, and a signal indicating whether the temperature of the power supply is within a specified range. Alternatively, the power supply may send numerical values to the controller. The controller may control, for each power supply, for example, whether the power supply is in a standby mode or in a fully operational mode. The controller may also receive information from the system being powered, for example a computer server system, regarding estimated current requirements.

Figure 2:
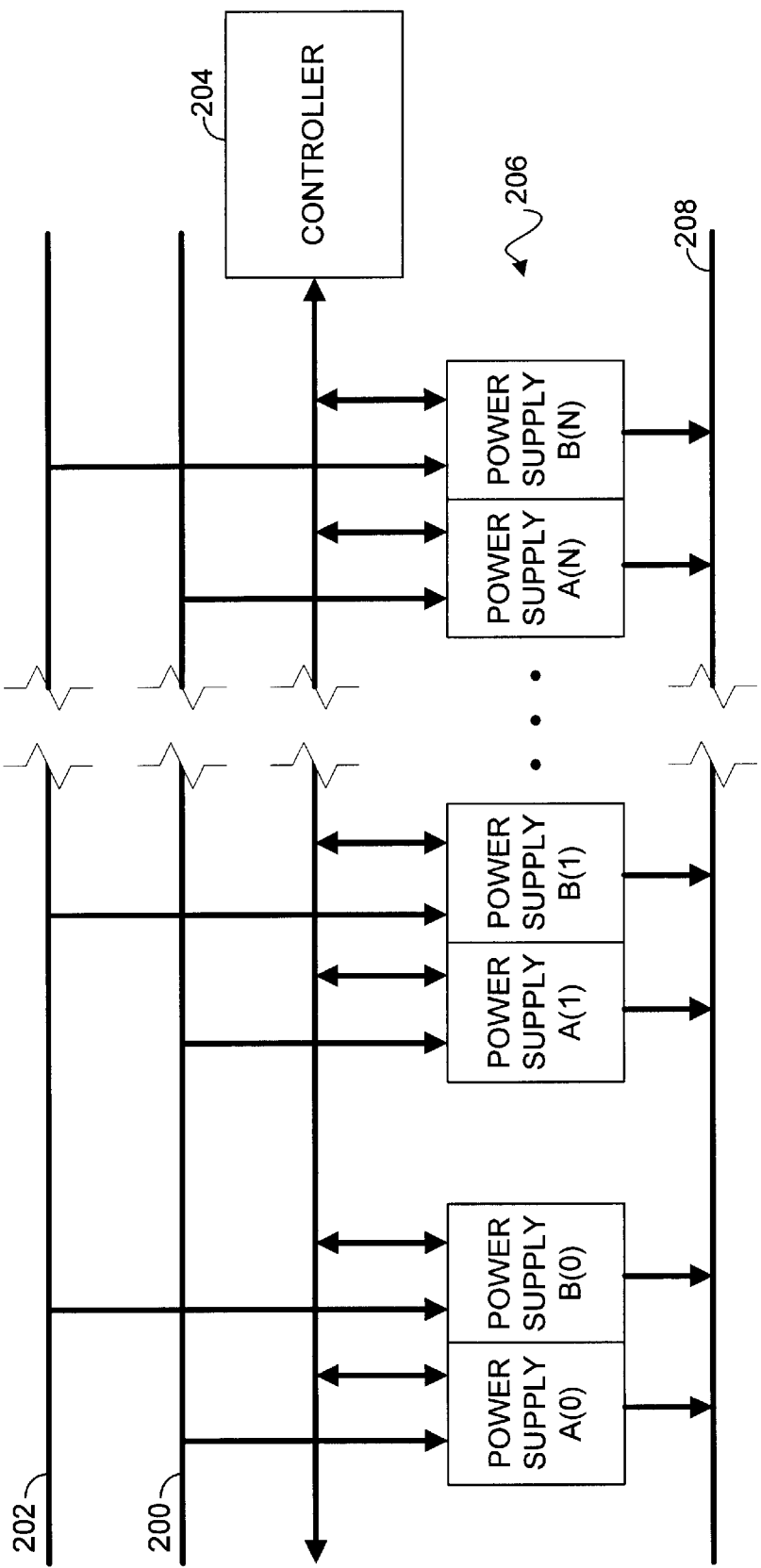
FIG. 2 is a block diagram of an example of a power supply system with multiple power sources in accordance with the invention.

FIG. 2 illustrates an alternative example of a power supply system for which the invention is applicable. In the system illustrated in FIG. 2, there are two power sources 200 and 202. Power sources 200 and 202 could be, for example, two separate phases of a 3-phase AC power main, or one phase of an AC power main and the output of a local AC generator, or two separate isolated DC sources. FIG. 2 depicts six of 2N+2 power supplies (generally identified by reference number 206), labeled A(0)–A(N) and B(0)–B(N). Power supplies A(0)–A(N) are connected to power source 200, and power supplies B(0)–B(N) are connected to power source 202. The outputs of all the power supplies 102 are connected in parallel (through isolation diodes) to a DC power bus 208. DC power bus 208 may have multiple DC voltages plus one or more reference potentials or ground. A controller 204, discussed in more detail below, receives signals from the power supplies 206, and sends control signals to the power supplies 206. As discussed for controller 102 in FIG. 1, controller 204 in FIG. 2 may receive from each power supply, for example, a signal indicating whether the input voltage to the power supply is within a specified range, a signal indicating whether the output voltage is within a specified range, a signal indicating whether the output current for the power supply is within a specified range, and a signal indicating whether the temperature of the power supply is within a specified range. Alternatively, the power supply may send numerical values to the controller. The controller may control, for each power supply, for example, whether the power supply is in a standby mode or in a fully operational mode.

Energy efficiency is of particular interest in the present application. In general, within the designed range of output current, individual power supply efficiency improves with increasing output current. In a configuration as illustrated in FIG. 1, the maximum current required by the system (not illustrated), attached to the power bus 106, can be supplied by, for example, N of the N+1 power supplies. If parts of the system do not require maximum current, then even fewer than N power supplies may supply the required current. In a configuration as illustrated in FIG. 2, the maximum current required by the system (not illustrated), attached to the power bus 208, can be supplied by, for example, N of the 2N+2 power supplies. That is, for a system as in FIG. 2, one power source (200 or 202) can fail, and one of the N+1 power supplies attached to one power source can fail, and the remaining N operational power supplies can provide the maximum current required by the system. In the system of FIG. 2, if both power sources 200 and 202 are available, and if all power supplies are operational, each individual power supply is providing less than 50% of its maximum output current. For many power supply designs, this is a relatively low efficiency operating point. Accordingly, there is a need to be able have some of the power supplies operating at their point of maximum efficiency, and have the remaining power supplies in a standby mode, from which they can rapidly become fully operational when needed. Some power supplies may placed into standby mode if their output current falls below a threshold, for example, 75% of the maximum design current for one power supply. The threshold may vary depending on the number of power supplies, number of power sources, power supply efficiency characteristics, and other system parameters.

Figure 3:
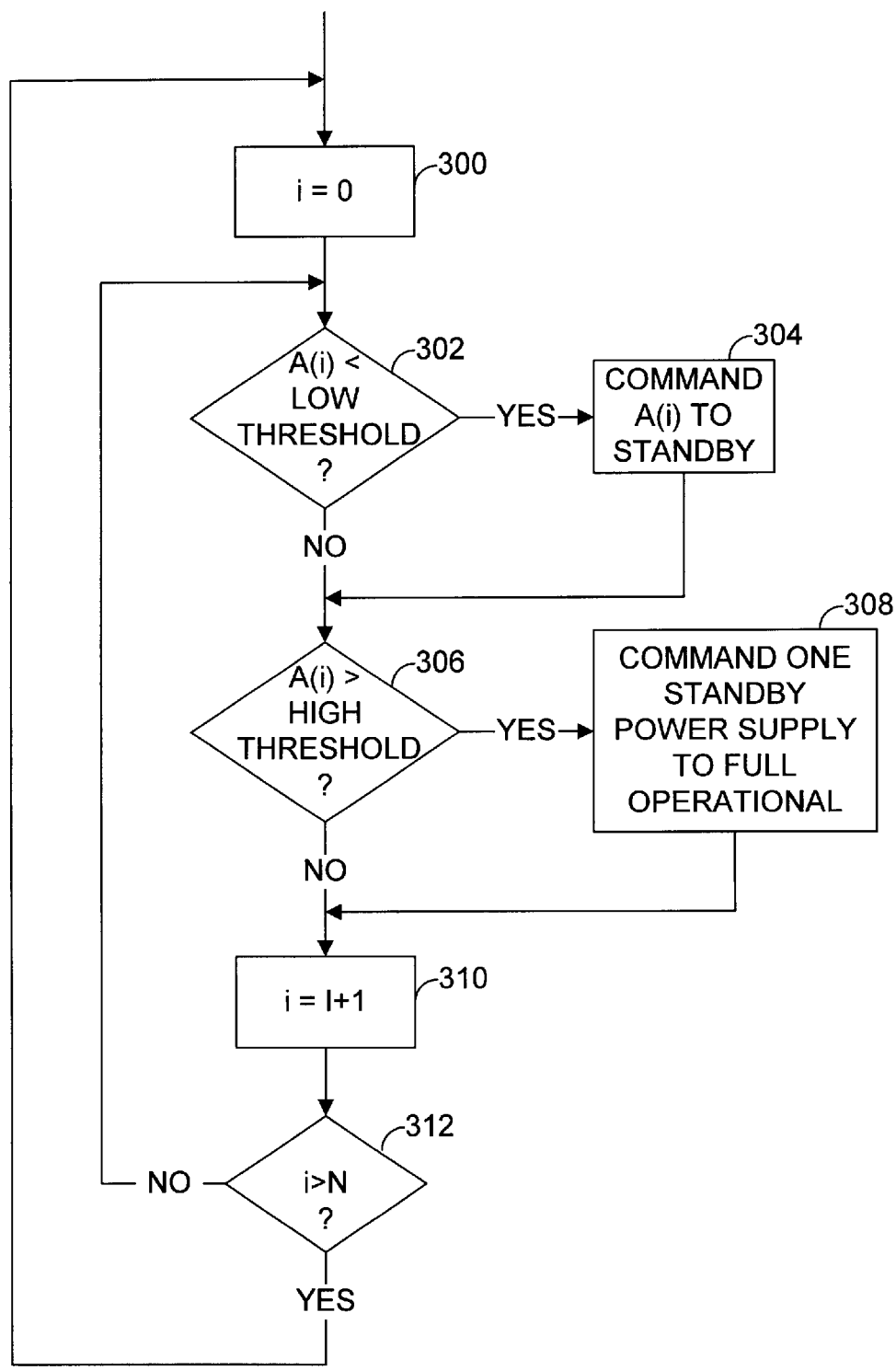
FIG. 3 is a flow chart of an example method in accordance with the invention.

FIG. 3 illustrates one example of part of a method to reduce the number of operating power supplies to improve energy efficiency. The method in FIG. 3 may be implemented by controller 102 in FIG. 1 or by controller 204 in FIG. 2. In the method of FIG. 3, the controller repeatedly polls the status of some of the individual power supplies. At step 300, an index is set to zero. At step 302, the status of the output current for one power supply corresponding to the index value of step 300 is read by the controller. If the output current for power supply A(i) is less than a low threshold, then at step 304 the controller commands power supply A(i) to switch to a standby mode.

In the method illustrated in FIG. 3, at step 306, if the output current for power supply A(i) is greater than a higher threshold, for example, 90% of maximum design current, then at step 308 the controller commands at least one standby power supply to switch to a fully operational mode. The controller may track which power supplies are in standby mode, and the controller may use any method to select at least one power supply to switch to a fully operational mode. If a power source fails, or if there is any other indication that an increased load is need, then preferably all power supplies should be returned to the fully operational mode. After some specified time period, some power supplies could be returned to a standby mode.

Figure 5:
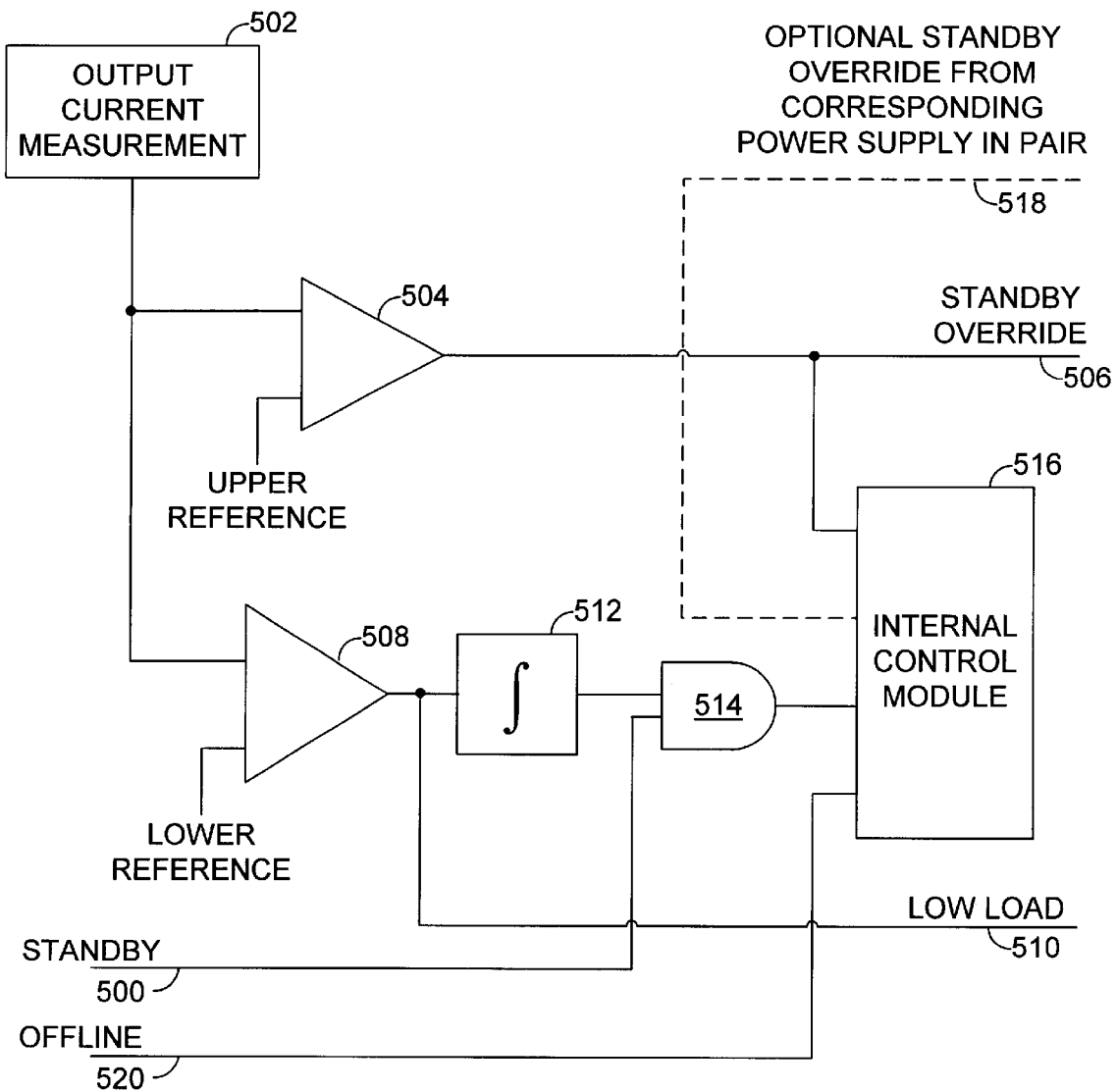
FIG. 5 is a functional block diagram of example circuitry within a power supply in accordance with the invention.

Polling by a controller, as illustrated in FIG. 3, may add some delay in switching power supplies from standby to fully operational. Accordingly, it may be preferable for each supply to monitor current continuously, and inform the controller, for example by processor interrupt, immediately when current exceeds an upper threshold. An example is illustrated in FIG. 5. Also, as will be discussed in conjunction with FIG. 5, instead of the controller commanding a power supply to switch to a fully operational mode, another power supply may signal a power supply to switch to a fully operational mode.

In the method of FIG. 3, when current tests are complete for power supply A(i), the controller increments the index (step 310) and then repeats the procedure for the next power supply.

Figure 4:
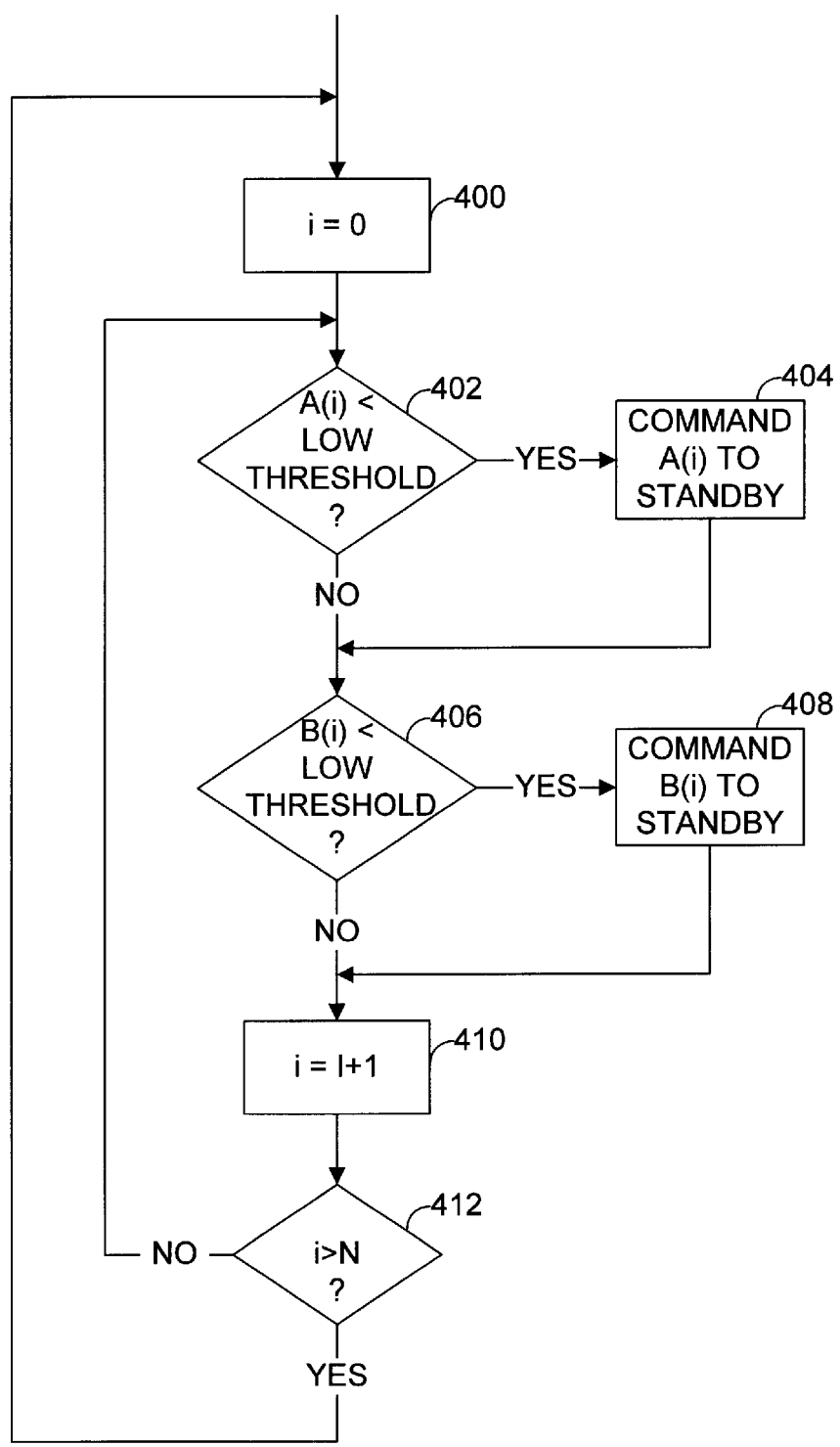
FIG. 4 is a flow chart of an alternative example method in accordance with the invention.

Note that the method of FIG. 3, for a dual power source system as in FIG. 2, the system may switch all the power supplies connected to power source 200 (power supplies A(i)) to standby, leaving only the power supplies connected to power source 202 (power supplies B(i)) fully operational. It may be preferable to leave some supplies operational on each power source. FIG. 4 illustrates an alternative method in which the current outputs of dual supplies are checked on each pass through the loop, and the controller may command power supplies on either power source to switch to standby.

In FIG. 4, as in FIG. 3, the controller repeatedly polls the status of some of the individual power supplies. At step 400, an index is set to zero. At step 402, the status of the output current for one power supply corresponding to the index value of step 400 is read by the controller. If the output current for power supply A(i) is less than a low threshold, then at step 404 the controller commands power supply A(i) to switch to a standby mode. At step 406, the status of the output current for the other supply corresponding to the index value of step 400 is read by the controller. If the output current for power supply B(i) is less than the low threshold, then at step 408 the controller commands power supply B(i) to switch to a standby mode. The equivalent of steps 306 and 308 of FIG. 3 may optionally be performed in the method of FIG. 4, as discussed in conjunction with FIG. 3.

When the system is first powered-on, all power supplies initially are in a fully operational mode. The controller may then follow a method as illustrated in FIG. 3 or 4 to put power supplies, one at a time, into a standby mode, until the remaining operational power supplies all have output currents that exceed the lower threshold. If a particular power supply has an output current that is below the lower threshold, it is not necessary for the controller to command the particular power supply to switch to a standby mode. The controller may switch power supplies to standby in a particular order, regardless of which power supplies are measured with low output current. For power supplies in pairs, the controller may switch both supplies in a pair to standby after detecting a low output current for only one power supply in the pair. Alternatively, each power supply could provide a numerical output to the controller, indicating output current level, and the controller could compute how many power supplies should be placed into standby mode. The controller would then send commands to the appropriate number of power supplies, without executing a polling loop.

Preferably, the system should include some safeguards to prevent unintentional switching to standby, and to prevent continuous cycling between standby and full operation, and to prevent reaction to transient conditions. FIG. 5 illustrates an example of circuitry, inside a power supply, which might be used in conjunction with a standby command from a controller. In FIG. 5 there is an upper reference value, corresponding, for example, to 90% of maximum output current, and a lower reference value, corresponding, for example, to 75% of maximum output current. In FIG. 5, the power supply has an input 500 for a standby command from a controller. The power supply measures its own output current (module 502). As illustrated in FIG. 5, the measure of the output current may be represented as a voltage signal, but as discussed above, could also be numerical. In the example configuration illustrated in FIG. 5, an analog comparator 504 compares a voltage signal, representing measured output current, to the upper reference voltage, and determines whether the output current exceeds the upper threshold for the power supply. In the example illustrated in FIG. 5, if the output current exceeds the upper threshold, the power supply sends an override signal 506 to the controller indicating that the power supply will override any standby signal. That is, the power supply will remain fully operational, even if commanded to switch to a standby mode. A second analog comparator 508 determines whether the output current is less than the lower threshold. The output of comparator 508 is sent to the controller to indicate that the output current is low (FIG. 3, step 302, FIG. 4, step 402). The output of the lower reference comparator 508 is integrated over time (integrator 512). If the power supply is receiving a signal to switch to standby (500), and if the output of the integrator 512 indicates that the power supply has been operating with an output current that is less than the lower threshold for some extended time, then the power supply places itself into a standby mode (power supply internal control module 516). The time delay needs to be long enough to prevent noise and transients from inadvertently triggering a standby mode.

For configurations with two power sources, as illustrated in FIG. 2, there are commercially available power supplies that are configured with a pair of power supplies in a single package. Optionally, each power supply in a pair of power supplies could contain circuitry as illustrated in FIG. 5. Signal 518 in FIG. 5 is an optional input from the other power supply of a pair. For example, the output of the upper reference comparator in each B(i) power supply would go to the corresponding A(i) power supply as a standby override signal, and the output of the upper reference comparator in each A(i) power supply would go to the corresponding B(i) power supply as a standby override signal. Then, for example, if the output current of power supply B(2) exceeds the upper threshold, then the standby override signal from power supply B(2) would force power supply A(2) to be in a fully operational mode, and power supply A(2) would ignore any commands to switch to a standby mode. Optionally, if power supply A(2) is already in a standby mode, standby override signal from power supply B(2) would cause power supply A(2) to switch to a fully operational mode. Accordingly, for power supplies configured in pairs, one power supply in a pair may be in standby mode, and instead of the controller commanding the standby power supply to switch to fully operational mode, the corresponding power supply in the pair may signal the standby power supply to switch to a fully operational mode.

If a power source (FIG. 2, power source 200 or power source 202) should fail, or if a power supply should fail, at least one power supply needs to switch from standby mode to fully operational mode before the overall output bus current is affected. Power supplies typically have some energy storage (in capacitors and/or inductors), so that full current can be provided for some period of time after the power source is off. Commercially available power supplies can switch from standby mode to fully operational mode in 20 to 50 msec. The energy storage for power supplies can be designed to provide more than 50 msec of full output current after loss of the power source, so that some power supplies can switch from standby to operational before the sourceless supplies stop supplying full output current. Note in FIG. 5 that the integrator 512 has a role in switching from fully operational mode to standby mode, but does not affect the time required to switch from standby mode to fully operational mode.

Individual power supplies may include fans or other cooling means. Preferably, if a power supply is in standby mode, the cooling means should also be turned off for further efficiency. If a package of two power supplies contains one cooling fan, it may be preferable to make fan control dependent on temperature. Alternatively, temperature may be measured within each package, with the measurement sent to the controller, and cooling may be controlled by the controller.

Optionally, a controller may also turn some power supplies completely off (or offline), as opposed to just switching to a standby mode, further conserving energy. In some systems, a rack or cabinet may be provided that has the capability to hold many electronic devices, but may only be partially populated with electronic devices. For example, some computer systems comprise multiple printed circuit boards, where each circuit board is a separate computer. The rack or cabinet may contain enough power supplies to provide power to a fully populated system. A controller, as depicted by FIG. 1, 102 and FIG. 2, 204, may sense how many electronic devices are actually present, and instead of switching some power supplies to standby, may switch an appropriate number of power supplies completely off (or to an offline mode). For example, assume that a rack can accommodate four computers, and that ten power supplies are provided. If only two computers are actually installed, the power system controller may command five power supplies to turn off (or go into an offline mode). In FIG. 5, signal 520 depicts an input signal commanding a power supply to turn off (or go into an offline mode). Signal 520 is depicted as an input to the control module 516, but may go to some other part of a power supply as appropriate to implement the function. A power supply that is off, or offline, cannot be rapidly switched to a fully operational mode.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An electronic system, comprising:
   a plurality of power supplies; and
   at least one power supply is switched to a standby mode when the output current of at least one power supply is less than a threshold.

2. The electronic system of claim 1, further comprising:

a controller; and the controller commands a particular power supply to switch to the standby mode when the particular power supply indicates, to the controller, that the output current of the particular power supply is less than the threshold.

3. The electronic system of claim 2, further comprising:

at least one of the power supplies overriding a command from the controller to switch to the standby mode when the output current of the power supply exceeds a second threshold.

4. The electronic system of claim 2, further comprising:

at least one of the power supplies switching to the standby mode in response to a command from the controller only when the output current of the power supply is less than the threshold for a period of time.

5. The electronic system of claim 2, further comprising:

the power supplies configured into modules, each module comprising two power supplies; and one power supply, in one of the modules, overriding a command from the controller to switch to the standby mode, in response to a signal from the other power supply in the module.

6. The electronic system of claim 1, further comprising:

a controller that computes a number of power supplies to be switched to the standby mode; and the controller commands the number of power supplies to switch to the standby mode.

7. The electronic system of claim 6, further comprising:

at least one of the power supplies overriding a command from the controller to switch to the standby mode when the output current of the power supply exceeds a second threshold.

8. The electronic system of claim 6, further comprising:

at least one of the power supplies switching to the standby mode in response to a command from the controller only when the output current of the power supply is less than the threshold for a period of time.

9. The electronic system of claim 6, further comprising:

the controller computes a number of the power supplies to be switched to an off mode; and the controller command the number of power supplies to switch to the off mode.

10. The electronic system of claim 1, further comprising:

at least one power supply is switched from the standby mode to a fully operational mode when the output current of least one power supply is greater than a second threshold.

11. The electronic system of claim 10, further comprising:

a controller;

at least one power supply switching from the standby mode to the fully operational mode in response to a command from the controller.

12. The electronic system of claim 10, further comprising:

at least one power supply switching from the standby mode to the fully operational mode in response to a signal from one of the power supplies.

13. The electronic system of claim 10, further comprising:

the power supplies configured into modules, each module comprising two power supplies; and one power supply, in one of the modules, switching from the standby mode to the fully operational mode in response to a signal from the other power supply in the module.

14. The electronic system of claim 1, further comprising:

first and second power sources, at least some of the power supplies coupled to the first power source and at least some of the power supplies coupled to the second power source, and where only power supplies coupled to one of the power sources is switched to the standby mode.

15. The electronic system of claim 1, further comprising:

first and second power sources, at least some of the power supplies coupled to the first power source and at least some of the power supplies coupled to the second power source, and where at least one power supply coupled to the first power source and at least one power supply coupled to the second power source are switched to the standby mode.

16. The electronic system of claim 1, further comprising:

at least one cooling fan; and at least one cooling fan is switched off when at least one power supply is switched to a standby mode.

17. A method of controlling power supplies in an electronic system, comprising:

measuring current output from at least one of the power supplies;

switching at least one of the power supplies to a standby mode when its current output is less than a threshold.

18. The method of claim 17, further comprising:

switching, to the standby mode, power supplies coupled to a first power source and not switching, to the standby mode, power supplies coupled to a second power source.

19. The method of claim 17, further comprising:

switching, to the standby mode, at least one power supply coupled to a first power source and at least one power supply coupled to a second power source.

20. The method of claim 17, further comprising:

switching at least one of the power supplies from the standby mode to a fully operational mode when at least one of the power supplies has an output current that exceeds a second threshold.

21. The method of claim 17, further comprising:

receiving, by a controller, the measured output current; and sending, by the controller, a command, to the power supply, to switch to the standby mode.

22. The method of claim 21, further comprising:

switching, by the power supply, to the standby mode, in response to the command from the controller, only when the power supply output current is less than the threshold for a period of time.

23. The method of claim 17, further comprising:

switching at least one cooling fan off for at least one of the power supplies that are switched to the standby mode.

24. A method of controlling power supplies in an electronic system, comprising:

determining, by a controller, that at least one of the power supplies has an output current that is less than a threshold; and sending, by the controller, a command to at least one power supply to switch to a standby mode.

25. The method of claim 24, further comprising:

computing, by the controller, a number of the power supplies to be switched to a standby mode; and sending, by the controller, commands to the number of power supplies to switch to the standby mode.

26. The method of claim 24, further comprising:
overriding, by a power supply, a command from the controller to switch to a standby mode, when the power supply output current exceeds a second threshold.

27. The method of claim 24, further comprising:
overriding, by a power supply, a command from the controller to switch to a standby mode, when a corresponding power supply in a pair of power supplies has an output current that exceeds a second threshold.

28. The method of claim 24, further comprising:
switching, by a power supply, to a standby mode, in response to a command from the controller, only when the output current of the power supply is less than the threshold for a time period.

29. The method of claim 24, further comprising:
determining, by the controller, that at least one of the power supplies has an output current that is greater than a second threshold; and
sending, by the controller, a command to at least one power supply, to switch from a standby mode to a fully operational mode.

30. The method of claim 24, further comprising:
switching, by a power supply, from a standby mode to a fully operational mode when a corresponding power supply in a pair of power supplies has an output current that exceeds a second threshold.

31. The method of claim 24, further comprising:
sending, by the controller, a command to at least one power supply, to switch to an off state.

32. An electronic system, comprising:
means for measuring output current of power supplies; and
means for switching at least one of the power supplies to a standby mode when at least one the power supplies has an output current that is less than a threshold.

* * * * *